(12) United States Patent
Merkel et al.

(10) Patent No.: US 7,881,306 B2
(45) Date of Patent: Feb. 1, 2011

(54) SWITCHGEAR ASSEMBLY SYSTEM AND METHOD FOR INSTALLATION OF WITHDRAWABLE UNITS IN SWITCHGEAR ASSEMBLIES

(75) Inventors: Hans-Peter Merkel, Schriesheim (DE); Gunnar Zank, Teutschenthal (DE)

(73) Assignee: ABB Patent GmbH, Ladenburg (DE)

( * ) Notice: Subject to any disclaimer, the term of this patent is extended or adjusted under 35 U.S.C. 154(b) by 967 days.

(21) Appl. No.: 10/552,278

(22) PCT Filed: Mar. 25, 2004

(86) PCT No.: PCT/EP2004/003153

§ 371 (c)(1),
(2), (4) Date: Sep. 14, 2006

(87) PCT Pub. No.: WO2004/088928

PCT Pub. Date: Oct. 14, 2004

(65) Prior Publication Data

US 2007/0019369 A1    Jan. 25, 2007

(30) Foreign Application Priority Data

Apr. 4, 2003   (DE) .............................. 103 15 730

(51) Int. Cl.
*H04L 12/56* (2006.01)
(52) U.S. Cl. ...................... 370/400; 370/419
(58) Field of Classification Search ............... 370/419, 370/420, 423, 463, 465, 466, 254; 709/220–226; 710/8; 340/506
See application file for complete search history.

(56) References Cited

U.S. PATENT DOCUMENTS 6,557,049 B1 * 4/2003 Maloy et al. ............... 710/8

(Continued)

FOREIGN PATENT DOCUMENTS

WO    WO 0205107 A1 *  1/2002

OTHER PUBLICATIONS

Prof. Dr. Frithjof Klasen, "Feldbus, Ethernet, Internet, TCP/IP-Alles klar?" Online! Nov. 15, 2000.

(Continued)

*Primary Examiner*—Thai D Hoang
(74) *Attorney, Agent, or Firm*—Buchanan Ingersoll & Rooney PC

(57) ABSTRACT

Disclosed is a system for installing withdrawable units (11) into switchgears. Said withdrawable units (11) are installed on certain levels (12, 14, 16, 18) of switchgear cabinets (10), communicate via a fieldbus, and are unambiguously identified via a unit address while basic data required for operating the unit is contained in a memory of the withdrawable unit. Each switchgear cabinet (10) is provided with at least one Ethernet switch (20) with which at least the withdrawable units communicate. An application server (30) managing at least the TCP/IP address allocation as well as a database (40) in which at least the unit data of at least the withdrawable units (11) is at least stored and/or managed are also part of the system. Further disclosed is a method for installing withdrawable units (11) into switchgears, said withdrawable units (11) being installed on certain levels (12, 13, 16, 18) of a switchgear cabinet (10), communicating via a fieldbus, being unambiguously identifiable via a unit address, and containing, in a memory, basic data required for operating the unit. Communication via the fieldbus is based on Ethernet TCP/IP technology, the unit addresses of the withdrawable units (11) are automatically assigned thereto and managed by an application server (30) which is integrated into the Ethernet network, and at least the basic data for each withdrawable unit (11) is automatically downloaded from a database (40) into the withdrawable unit (11).

20 Claims, 1 Drawing Sheet

Legend

10 - switchgear cabinet
11 - withdrawable unit
12 - installation location
13 - port
14 - installation location
15 - port
16 - installation location
17 - port
18 - installation location
19 - port
20 - switch
30 - application server
40 - database
50 - memory

U.S. PATENT DOCUMENTS

| | | | |
|---|---|---|---|
| 7,002,907 B1* | 2/2006 | Chen et al. | 370/254 |
| 7,254,630 B1* | 8/2007 | Daude et al. | 709/224 |
| 2002/0010791 A1* | 1/2002 | Kalkunte et al. | 709/238 |
| 2005/0183875 A1* | 8/2005 | Quero et al. | 174/59 |
| 2007/0101173 A1* | 5/2007 | Fung | 713/300 |

OTHER PUBLICATIONS

Hadellis et al., "An integrated approach for an interoperable industrial networking architecture consisting of heterogeneous filedbuses", Computers in Industry, Elsevier Science Publishers, Amsterdam, NL, vol. 49, No. 3, Dec. 2002.

* cited by examiner

Legend

- 10 - switchgear cabinet
- 11 - withdrawable unit
- 12 - installation location
- 13 - port
- 14 - installation location
- 15 - port
- 16 - installation location
- 17 - port
- 18 - installation location
- 19 - port
- 20 - switch
- 30 - application server
- 40 - database
- 50 - memory

SWITCHGEAR ASSEMBLY SYSTEM AND METHOD FOR INSTALLATION OF WITHDRAWABLE UNITS IN SWITCHGEAR ASSEMBLIES

This application claims priority under 35 USC §119 to German application No. 103 15 730.1, filed Apr. 4, 2003, and under 35 USC §371 to International Application No. PCT/EP2004/003153, filed Mar. 25, 2004, the contents of which are incorporated herein by reference in their entirety.

FIELD

The invention relates to a switchgear system and to a method for installation of withdrawable units in switchgear assemblies, in particular in low-voltage switchgear assemblies, and to a withdrawable unit.

BACKGROUND

Switchgear assembly systems, in particular low-voltage switchgear assemblies, using withdrawable insert technology are known in principle and are marketed by a number of manufacturers using different product brand names, for example SIEMENS using the name SIVACON with the withdrawable unit Simocode DP or by ABB using the name MNS with the withdrawable unit INSUM.

In this case, very widely different low-voltage switching devices are nowadays combined, installed and connected to one another in inserts, thus resulting in modular withdrawable units, which are also referred to here as appliances. A number of appliances communicate via a field bus, which is also referred to for short in the following text as a bus. Each of these communicating appliances is provided by means of a configuration tool with a unique address, in order to allow communication. The address is stored in a non-volatile form in the appliance, to be precise according to the prior art either being set manually by means of dip switches or being set in a non-volatile electronic memory.

In addition, further basic information which is required for operation also referred to in the following text as appliance data, is stored in a non-volatile form in the appliance. This data may, for example, be limit values which have to be monitored or complied with, or critical time parameters or parameters for the bus protocol.

When a new appliance is connected to the bus, the appliance address which prevents confusion about the appliance and allows it to be identified in the bus system, must first of all be programmed using a configuration tool. This must be done first of all before the bus connection can be set up and the appliance data can be loaded into the appliance, using a further tool.

When an appliance is replaced, the appliance data must first of all be read with the aid of tools and must be temporarily stored outside the switchgear assembly, before the new appliance is physically installed, the address is allocated and the new appliance can once again be loaded with the appliance data from the temporary store, as described above.

Thus, when withdrawable units are installed according to the prior art in switchgear assemblies, extensive manual actions are required in order to carry out the necessary operations, and additional appliances and software programs are required, that have to be controlled manually.

SUMMARY

Against the background of the prior art as described above, the object of the present invention is thus to provide a switchgear assembly system and a method which considerably simplify the installation of withdrawable units in switchgear assemblies.

The object is achieved by characterizing features as described herein with regard to the switchgear assembly system, and with regard to the method.

Thus, according to the invention, at least one withdrawable unit in a switchgear assembly communicates with the field bus by means of the Ethernet TCP/IP technology, and the at least one withdrawable unit has a TCP/IP interface.

TCP/IP is a specific type of bus protocol which originates from Internet technology, where it is also used. Ethernet is a type of bus that can be used for industrial purposes.

In one highly advantageous embodiment of a system according to the invention, at least one Ethernet switch, with which the at least one withdrawable unit communicates, is fitted in each switchgear cabinet. Furthermore, an application server is provided in the Ethernet network and manages at least the TCP/IP address allocation, and a database is provided, in which at least appliance data for the at least one withdrawable unit is at least stored and/or managed. The mechanisms which are used in this case for address allocation by an application server, also referred to as DHCP server, are in this case known per se in the prior art.

According to one particularly advantageous refinement of the invention, each insert compartment—also referred to as an installation slot in the following text—is allocated a unique port of the Ethernet switch. In this case, a plurality of insert compartments or installation locations can be arranged on one level within the switchgear cabinet.

A further advantageous refinement option of the invention provides that the database contains, at least for each withdrawable unit, at least information relating to its installation location and to its intended application. Information relating to the installation location may in this case advantageously be details relating to the Ethernet switch and to the port of the Ethernet switch to which the withdrawable unit is allocated. Application-related information advantageously includes a unique application identification and associated appliance data.

Systems designed according to the invention are distinguished in that appliance data can be interchanged between the database and a withdrawable unit via the application server.

It is particularly advantageous for the application server to contain appliance identification software for identification of an appliance which is allocated to a port of an Ethernet switch. In this case, the appliance identification software can identify the appliance type of an appliance which is allocated to one port of an Ethernet switch. The appliance identification software can advantageously also control the interchange of appliance data between the database and a withdrawable unit via the application server.

With regard to the method for installation of withdrawable units in switchgear assemblies, the invention comprises the communication via the field bus being based on Ethernet TCP/IP technology, and the appliance addresses for the withdrawable units being allocated to them and managed automatically by an application server which is integrated in the Ethernet network, with at least the basic information for each withdrawable unit being automatically downloaded from a database to the withdrawable unit.

In this case, it is particularly advantageous for the appliance addresses to be allocated automatically to the withdrawable units during or after the installation in the cabinet of the switchgear assembly, and/or for the basic information to be downloaded automatically into the withdrawable units during or after the installation of the withdrawable units in the switchgear cabinet. This is because there is no longer any need for manual actions on the withdrawable units before their insertion into their intended installation location, thus considerably simplifying the installation process.

It is particularly advantageous for at least the basic information for each withdrawable unit to be downloaded from the database via the application server. It is also advantageous, in addition to the basic information, for further application and appliance information for at least one withdrawable unit also to be automatically downloaded from the database into the withdrawable unit.

In addition, in one very advantageous refinement, the withdrawable units in the switchgear cabinet communicate by TCP/IP with an Ethernet switch which is allocated to that switchgear cabinet. Each switchgear cabinet level and/or the installation location of each withdrawable unit is then advantageously allocated a unique port of the Ethernet switch in the switchgear cabinet.

One advantageous refinement of the method according to the invention is characterized in that appliance data for all the switchgear assembly appliances is managed in the database. Information about the use of the withdrawable unit and the basic information required for this purpose are then stored together with the information about its installation location in an advantageous manner for each withdrawable unit.

A further highly advantageous refinement of the invention provides for the appliance type of a withdrawable unit to be identified automatically by the appliance server during its installation at an installation location in the switchgear cabinet. The software in the application server contains appropriate suitable program parts and/or routines for this purpose. The appliance data in the database is in this case automatically checked for compatibility with the appliance type identified by the application server. If no match is found, then the appliance data is not automatically loaded; instead of this, a message is emitted, thus providing good protection against confusion between appliances.

Overall, the advantage of the method according to the invention is that there is no need for appliance addresses and/or appliance data to be read in, read out or interchanged manually either during installation of a new withdrawable unit in a switchgear cabinet or during replacement of a withdrawable unit, for example in the course of maintenance work. The withdrawable unit is now just plugged into its intended installation location, and is thus physically connected to the Ethernet field bus system. The rest of the logical installation of the withdrawable unit is carried out automatically after this, without any manual action.

However, an even more advantageous variant of the invention provides for the capability for each method step nevertheless to be monitored and/or carried out manually when desired by the user or operator. Intervention by a human operator is therefore always still possible as a safety precaution in the event of an emergency.

A withdrawable unit according to the invention for installation in a switchgear assembly is characterized in that the field bus communication of the withdrawable unit is based on Ethernet TCP/IP technology, with the withdrawable unit containing at least one Ethernet TCP/IP interface.

Further advantageous refinements and improvements of the invention and further advantages are described herein.

BRIEF DESCRIPTION OF THE DRAWING

The invention as well as further advantageous refinements and improvements of the invention will be explained and described in more detail with reference to the single FIGURE, which illustrates a switchgear cabinet into which a withdrawable unit can be installed, according to at least one exemplary embodiment of the invention.

DETAILED DESCRIPTION

Figure 1:
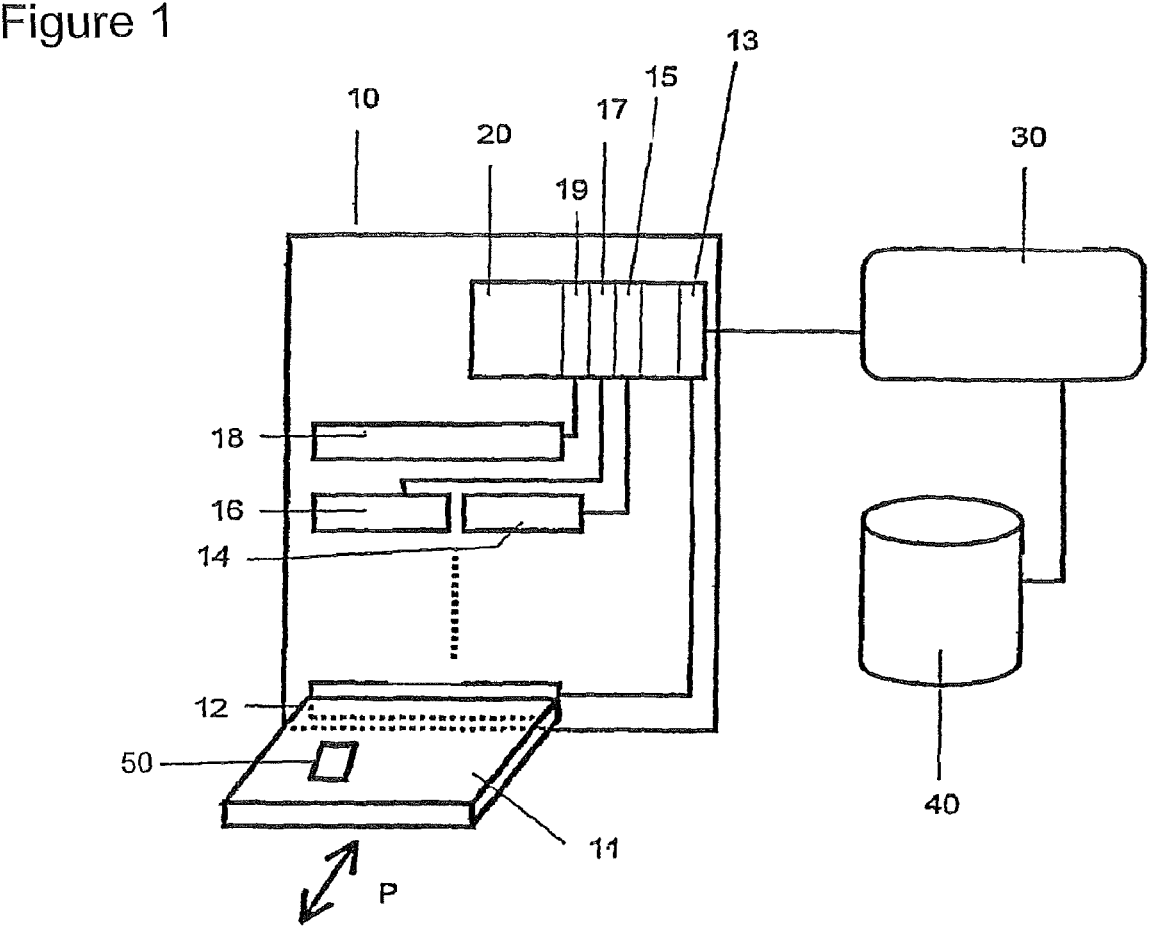

The FIGURE shows a switchgear cabinet 10 which is part of a switchgear assembly that is not illustrated here. The switchgear cabinet 10 contains four installation locations 12, 14, 16, 18 for withdrawable units, one withdrawable unit 11 of which is illustrated here in a representative form. The installation locations 14 and 16 are in this case arranged on one level within the switchgear cabinet 10. The switchgear cabinet 10 also contains an Ethernet switch 20 which has as many ports 13, 15, 17, 19 as there are installation locations 12, 14, 16, 18 in the switchgear cabinet. Each of the ports 13, 15, 17, 19 is connected to one and only one respective installation location 12, 14, 16, 18. The installation locations 12, 14, 16, 18 of the Ethernet switch 20 with the ports 13, 15, 17, 19 and the connecting lines between the ports 13, 15, 17, 19 and the installation locations 12, 14, 16, 18 are part of an Ethernet TCP/IP-based field bus system.

By way of example, the withdrawable unit 11 is a motor protective circuit, which is inserted into the installation location 12 in the direction of the arrow P, for installation. While being inserted, the electrical connection with the Ethernet TCP/IP-based bus system is made via plug contacts on the narrow face of the withdrawable unit 11, facing the installation location 12.

The parts of the Ethernet TCP/IP-based field bus system also include an application server 30 and a database 40. The application server 30 is connected to the Ethernet switch 20 in the switchgear cabinet 10. The database 40 is connected to the application server 30, and is connected indirectly via this application server 30 to the Ethernet switch 20 in the switchgear cabinet 10.

Other parts and subsystems of a field bus system, such as a field bus controller or other bus subscribers, are not shown here, for the sake of clarity of the illustration.

The communication between all the involved appliances via the field bus is based on Ethernet TCP/IP technology. The mechanisms used for address allocation by a DHCP server are prior art. The application server 30 which is integrated in the Ethernet network operates as a DHCP server, that manages the TCP/IP address allocation.

In addition, appliance data for at least the withdrawable units is stored and managed in the database 40. In this case, the database 40 contains at least the following appliance-related information: a unique application identification of the appliance, for example the identification from the power station identification system (KKS) when the switchgear assembly is used in a power station, further appliance data and information relating to the installation location, for example the switchgear cabinet (Ethernet switch) and installation location (port of an Ethernet switch) in which the appliance is installed. In the case of the motor protective circuit 11, further appliance data such as this includes, for example, current or temperature limit values or disconnection or tripping times that are not to be exceeded.

The withdrawable units 11 each include a memory 50 configured to store therein basic operation information which is required for operating the corresponding withdrawable unit 11. The withdrawable units 11 in their installation locations 12, 14, 16, 18 in the switchgear cabinet 10 first of all communicate via Ethernet TCP/IP with the Ethernet switch 20 allocated to that switchgear cabinet 10. This Ethernet switch 20 and the higher-level Ethernet network topology may be of redundant design.

Each installation location 12, 14, 16, 18 in the switchgear cabinet 10 is allocated a unique port of the Ethernet switch 20, in this case the installation location 12 being allocated the port 13, the installation location 14 the port 15, the installation location 16 the port 17 and the installation location 18 the port 19.

When a new appliance, for example the motor protective circuit 11, is inserted into an installation location, in this case the installation location 12, in the switchgear assembly 10, the application server 30 identifies that an appliance has been inserted into an installation location, and which installation location it has been placed in. The application server 30 then automatically allocates a TCP/IP address to that appliance.

A software program in the application server 30 identifies the new appliance, and loads the application associated with that installation location, and the required appliance data, from the database 40 via the application server 30 into that appliance. During this process, the field bus system ensures that the up to date appliance data is always available in the database 40.

In addition, the software can identify what type of appliance has been inserted, for example a motor circuit breaker, a motor starter or a fuse strip. A check is then carried out to determine whether the application and/or the appliance data which are/is stored in the database relating to this appliance also match/matches this appliance type. If no match can be found, the application is not automatically loaded, and a message is emitted. This ensures effective protection against confusion between withdrawable units.

If an appliance, for example the motor protective circuit 11 is now removed from the switchgear assembly 10, the application server 30 stores the information that an appliance has been removed, and which appliance has been removed, in the database 40. There is no need to read the appliance data back manually.

When an appliance is inserted again, then a check is carried out once the TCP/IP communication has been set up again to determine whether this is the appliance which was previously removed from this installation location and thus whether its installation-location-dependent application is still available. In this case, the application server will not download any new appliance data from the database 40. However, if the check shows that the appliance that has been inserted is a new appliance, then its appliance data is loaded into the appliance from the database 40 via the application server 30.

There is no need for any manual actions in order to initiate or to carry out the procedures described above of address allocation, address management and the transfer of appliance data to the appliance. The withdrawable unit is now just inserted into its intended installation location, and is thus physically connected to the Ethernet field bus system. The rest of the logical installation of the withdrawable unit is then carried out automatically without any manual action. If required, however, each method step can nevertheless be monitored and/or carried out manually, if desired by the user or operator. Intervention by a human operator is thus always still possible as a safety precaution in the event of an emergency.

The invention claimed is:

1. A switchgear assembly system comprising:
    withdrawable units each comprising a respective memory configured to store therein appliance operation information that is required for operation of the corresponding withdrawable unit;
    a switchgear cabinet including
        a plurality of insert compartments each configured to have installed thereinto a respective one of the withdrawable units,
        a field bus connected to each insert compartment to provide communication to each withdrawable unit respectively installed into a corresponding one of the insert compartments, and
        an Ethernet switch having a plurality of ports respectively allocated to a corresponding one of the insert compartments such that each insert compartment is allocated to a unique one of the ports, the Ethernet switch being configured to communicate with each one of the withdrawable units via the field bus according to an Ethernet TCP/IP protocol, such that each one of the withdrawable units installed into a corresponding one of the insert compartments is respectively allocated a unique TCP/IP address to enable the each one of the withdrawable units to constitute a TCP/IP interface;
    an application server configured to assign the respectively unique TCP/IP address to each one of the withdrawable units installed into a corresponding one of the insert compartments; and
    a database configured to at least one of store and manage respective appliance data for each one of the withdrawable units.

2. The switchgear assembly system according to claim 1, wherein the application server and database are arranged external to the switchgear cabinet.

3. The switchgear assembly system according to claim 1, wherein the application server is configured to communicate with the Ethernet switch included in the switchgear cabinet,
    the application server is configured to assign the respectively unique TCP/IP address to each one of the withdrawable units upon being first installed into a corresponding one of the insert compartments, and
    the application server is configured as a DHCP server to manage allocation of the unique TCP/IP address for each one of the withdrawable units.

4. The switchgear assembly system according to claim 3, wherein the appliance data stored in the database includes the respectively unique TCP/IP address assigned to each one of the withdrawable units by the application server.

5. The switchgear assembly system according to claim 1, wherein the appliance data stored in the database includes a unique identification respectively assigned to each one of the withdrawable units.

6. The switchgear assembly system according to claim 1, wherein the appliance data stored in the database includes information relating to at least one of an installation location and an intended application of each one of the withdrawable units, respectively.

7. The switchgear assembly system according to claim 1, wherein the appliance data stored in the database includes information relating to the Ethernet switch and to a corresponding one of the ports allocated to each one of the withdrawable units, respectively.

8. The switchgear assembly system according to claim 1, wherein the application server is configured to interchange the appliance data between the database and at least one of the withdrawable units.

9. The switchgear assembly system according to claim 1, wherein the application server is configured to execute appliance identification software to identify the withdrawable unit which is allocated to a corresponding one of the plurality of ports of the Ethernet switch.

10. The switchgear assembly according to claim 9, wherein the application server is configured to execute the appliance identification software to identify a type of the withdrawable unit which is allocated to the corresponding one of the ports of the Ethernet switch.

11. The switchgear assembly system according to claim 10, wherein the application server is configured to execute the appliance identification software to control an interchange of appliance data between the database and each one of the withdrawable units.

12. A method of installing withdrawable units in a switchgear assembly, the method comprising:
 installing withdrawable units in a respective one of a plurality of insert compartments of a switchgear cabinet, the withdrawable units each including a respective memory configured to store therein application operation information that is required for operation of the corresponding withdrawable unit;
 connecting each insert compartment to a field bus;
 connecting each insert compartment to a respectively unique one of a plurality of ports of the Ethernet switch via the field bus to enable the Ethernet switch to communicate according to the Ethernet TCP/IP protocol with each one of the withdrawable units installed into a corresponding one of the insert compartments
 automatically allocating a respectively unique TCP/IP address to each one of the withdrawable units by an application server connected to the Ethernet switch at one of (i) during installation of the withdrawable units into a corresponding one of the insert compartments and (ii) after installation of the withdrawable units into the corresponding one of the insert compartments; and
 downloading the application operation information from a database to the memory of each withdrawable unit automatically assigned a respectively unique TCP/IP address upon installation into a corresponding one of the insert compartments.

13. The method according to claim 12, wherein the application operation information for each withdrawable unit installed into a corresponding one of the insert compartments is downloaded from the database via the application server.

14. The method according to claim 12, wherein the application operation information and additional appliance information for each respective one of the withdrawable units are downloaded automatically from the database to the withdrawable units upon installation in a corresponding one of the insert compartments.

15. The method according to claim 12, wherein each of the withdrawable units communicates via TCP/IP with the port of the Ethernet switch to which the corresponding one of the insert compartments is uniquely connected.

16. The method according to claim 12, comprising storing appliance data for each one of a plurality of switchgear assembly appliances in the database.

17. The method according to claim 12, comprising storing in the database, for each respective one of the withdrawable units, information about use of the withdrawable unit and the appliance operation information of the withdrawable unit, together with information about a location of the insert compartment in which the withdrawable unit is installed.

18. The method according to claim 12, comprising identifying, in the application server, a type of each withdrawable unit application server during installation of each withdrawable unit in a corresponding one of the insert compartments, respectively.

19. The method according to claim 18, comprising automatically checking appliance data stored in the database with the respective type of each withdrawable unit application identified by the application server.

20. The method according to claim 12, comprising at least one of monitoring and manually carrying out at least one method step.

* * * * *